(12) United States Patent
Smith

(10) Patent No.: US 6,419,063 B1
(45) Date of Patent: Jul. 16, 2002

(54) SELF-ENERGIZING SYNCHRONIZER

(75) Inventor: Timothy S. Smith, Mattawan, MI (US)

(73) Assignee: Eaton Corporation, Cleveland, OH (US)

( * ) Notice: Subject to any disclaimer, the term of this patent is extended or adjusted under 35 U.S.C. 154(b) by 1 days.

(21) Appl. No.: 09/747,099

(22) Filed: Dec. 26, 2000

(51) Int. Cl.[7] ............................................. F16D 23/06
(52) U.S. Cl. .............................. 192/53.31; 192/53.331; 74/339
(58) Field of Search ..................... 192/53.31, 53.331, 192/53.33, 53.332, 53.36, 48.91; 74/339

(56) References Cited

U.S. PATENT DOCUMENTS

| | | | | |
|---|---|---|---|---|
| 5,078,245 A | * | 1/1992 | Nellums et al. ........ | 192/53.332 |
| 5,092,439 A | * | 3/1992 | Reynolds ............... | 192/53.331 |
| 5,544,727 A | * | 8/1996 | Braun ..................... | 192/48.91 |
| 5,558,194 A | * | 9/1996 | Cox ........................ | 192/53.31 |
| 5,713,447 A | * | 2/1998 | Skotnicki et al. ........ | 192/53.31 |
| 5,769,198 A | * | 6/1998 | Gluys et al. ............. | 192/53.31 |
| 5,901,824 A | | 5/1999 | Nellums .................. | 192/53.31 |
| 6,102,180 A | | 9/2000 | Gluys et al. ............. | 192/53.31 |

* cited by examiner

Primary Examiner—Saul Rodriguez
(74) Attorney, Agent, or Firm—Howard D. Gordon

(57) ABSTRACT

A self-energizing synchronizer (10) of the pin-type, double-acting with friction rings (22, 36 and 24, 38), jaw clutches (26, 28) engagable with jaw clutches (30b, 30c) defined by an annular member (30), three circumferentially spaced pins (40) including blocker shoulders for preventing asynchronous engagement of the jaw clutches, pre-energizer assemblies (42) to ensure initial engagement of the friction rings and blocker shoulders in response to initial engaging movement of a shift flange (32), and self-energizing producing an additive axial force ($F_a$) in response to cams (50b, 50c, 20e, 20f) and ramp (48e, 48f, 48g, 48h) reacting synchronizing torque. The ramps are defined by an H-shaped link (48) and the flange is axially secured to the annular member abutments (52, 54).

14 Claims, 4 Drawing Sheets

SELF-ENERGIZING SYNCHRONIZER

FIELD OF THE INVENTION

This invention relates to a self-energizing synchronizer for a transmission.

BACKGROUND OF THE INVENTION

Self-energizing pin-type synchronizers are known for use in step ratio transmissions to reduce shift effort and/or shift time. One such synchronizer, as shown in U.S. Pat. No. 5,901,824 to R Nellums and incorporated herein by reference, includes a radially disposed shift flange supported for limited rotation and non-axial movement on and relative to an annular member. The annular member is mounted in a shaft for non-rotation and axial movement relative thereto and includes jaw clutches that engage jaw clutches affixed to ratio gears. The self-energizing means includes a radially movable link that reacts between cams affixed to the flange and the shaft.

The synchronizer disclosed herein improves several features of the above synchronizer. The improvements include simplifying synchronizer assembly, eliminates flange to annular member retainers that need to be installed during assembly, improves rigidity of components associated with the self-energizing means, reduces unit stresses acting between the annular member and link, and improves jaw clutch contact for reducing jaw stress under high torque load.

SUMMARY OF THE INVENTION

An object of this invention is to provide a self-energizing synchronizer with improved structure and assembly.

Another object of this invention is to provide a self-energizing synchronizer with improved self-energizing means.

According to a feature of the invention, a self-energizing synchronizer for frictionally and positively connects first and second drives disposed for relative rotation about a common axis; the synchronizer comprising: an annular member including a first jaw clutch non-rotatable relative to the first drive and axially movable relative to the drives from a neutral position to an engaged position with a second jaw clutch for positive connecting the drives in response to engaging movement of the first jaw clutch by an axially directed shift force ($F_o$) moving a radially extending flange toward the second jaw clutch. The flange has axially oppositely facing sides and a radially inner portion receiving an annular outwardly facing surface of the annular member. Retainer means connects the flange for axial movement with the first jaw clutch. A first friction member is axially movable into engagement with a second friction member in response to an initial portion of the engaging movement of the first jaw clutch for producing an initial synchronizing torque. First and second blocker surfaces are movable into engagement in response to the initial synchronizing torque for preventing asynchronous engagement of the jaw clutches, for transmitting the shift force ($F_o$) to effect an engagement force of the friction members, and for producing a torque counter to the synchronizing torque for moving the blocker surfaces out of engagement as synchronization is reached. The first blocker surfaces are defined by a plurality of circumferentially spaced apart pins rigidly extending axially from the first friction member and into openings in the flange. The second blocker surfaces are defined about the openings and the pins are operative to transmit the synchronizing torque to the flange. Self-energizing means include a plurality of circumferentially spaced first cam means affixed to the flange, an equal plurality of circumferentially spaced apart second cam means affixed to the first drive, an equal plurality of circumferentially spaced apart and radially extending openings in the annular member, and a radially movable link deposed in each opening. Each link has radially outer and inner ends respectively disposed for engagement with the first and second cam means and operative when engaged to react the synchronizing torque therebetween for producing an additive axial force in the direction of the shift force for increasing the engagement force of the friction members.

The improvement is characterized by the retainer means including axially spaced apart first and second abutments extending radially outward from opposite axial ends of the annular member outwardly facing surface for axially embracing the flange sides. The first abutment includes a plurality of circumferentially spaced about tabs circumferentially offset from the openings and receiving slots in the radially inner portion of the flange for allowing positioning of the flange sides between the abutments during assembly of the synchronizer.

According to another feature of the invention, a synchronizer for frictionally and positively connecting first and second drives disposed for relative rotation about a common axis; the synchronizer comprising: an annular member including a first jaw clutch non-rotatable relative to the first drive and axially movable relative to the drives from a neutral position to an engaged position with a second jaw clutch for positive connecting the drives in response to engaging movement of the first jaw clutch by an axially directed shift force ($F_o$) moving a radially extending flange toward the second jaw clutch. The flange has axially oppositely facing sides and a radially inner portion receiving an annular outwardly facing surface of the annular member. Retainer means connects the flange for axial movement with the first jaw clutch. A first friction member is axially movable into engagement with a second friction member in response to an initial portion of the engaging movement of the first jaw clutch producing an initial synchronizing torque. First and second blocker surfaces are movable into engagement in response to the initial synchronizing torque for preventing asynchronous engagement of the jaw clutches, for transmitting the shift force ($F_o$) to effect an engagement force of the friction members, and for producing a torque counter to the synchronizing torque for moving the blocker surfaces out of engagement as synchronization is reached. The first blocker surfaces are defined by a plurality of circumferentially spaced apart pins rigidly extending axially from the first friction member and into openings in the flange. The second blocker surfaces are defined about the openings and the pins are operative to transmit the synchronizing torque to the flange. Self-energizing means include a plurality of circumferentially spaced first cam means affixed to the flange, an equal plurality of circumferentially spaced apart second cam means affixed to the first drive, an equal plurality of circumferentially spaced apart and radially extending openings in the annular member, and a radially movable link deposed in each opening. Each link has radially outer and inner ends respectively disposed for engagement with the first and second cam means and operative when engaged to react the synchronizing torque therebetween for producing an additive axial force in the direction of the shift force for increasing the engagement force of the friction members.

The improvement is characterized by each first cam means including a first pair of cam surfaces facing radially inward and axially spaced apart, and each link has axially spaced apart first and second flange portions joined together in H-shaped fashion by a web portion with surfaces of the flanges and web in close sliding relation with mating surfaces of the opening. Radially outer portions of the first and second flanges define a first pair of ramp surfaces engagable with the first pair of cam surfaces, and a radially inner portion of the web defines a second ramp surface engagable with the second cam means.

BRIEF DESCRIPTION OF THE DRAWINGS

The self-energizing synchronizer of the invention is shown in the accompanying drawings in which.

Figure 1:
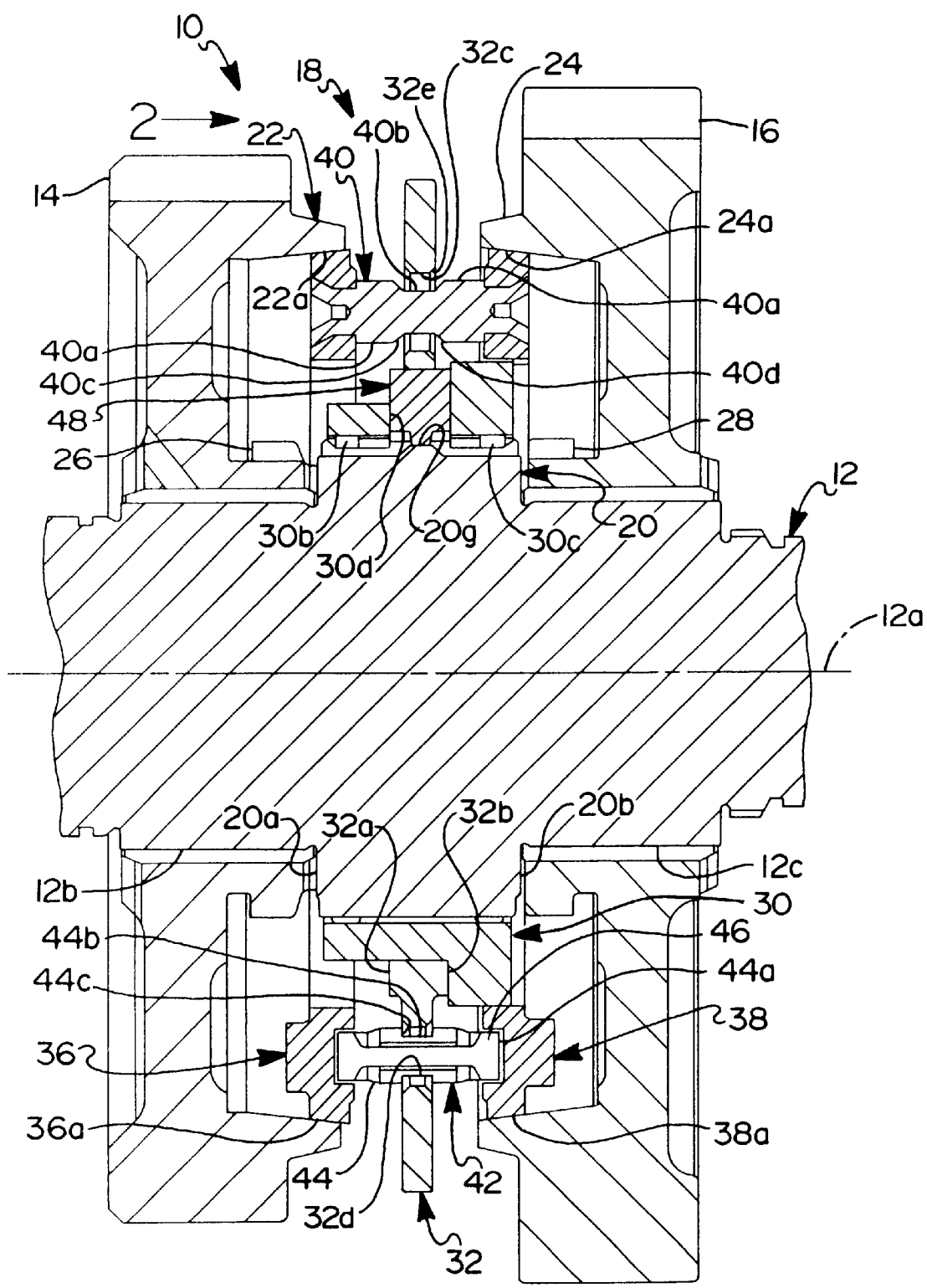
FIG. 1 illustrates a double-acting synchronizer in a neutral position and sectioned along line 1—1 of FIG. 2.

The drawings are simplified by omitting some component background lines.

DETAILED DESCRIPTION OF THE DRAWINGS

The term "synchronizer", used herein, shall designate a clutch mechanism utilized to non-rotatably couple a selected ratio gear to a shaft by means of jaw clutches in which attempted engagement of the jaw clutches is prevented until the jaw clutches are brought to substantially synchronous rotation by a synchronizing friction clutches associated with the jaw clutches. The term "self-energizing" shall designate a synchronizer which includes ramps or cams or the like to increase the engaging force of the synchronizing friction clutches in relation to the synchronizing torque of the friction clutches.

Looking now at the drawings, therein is shown a gear and synchronizer assembly 10 which forms part of a multi-ration change speed transmission. Assembly 10 includes a partially shown drive or shaft 12 mounted for rotation about a central axis 12a, axially spaced apart drives or gears 14, 16 supported on the shaft for rotation relative thereto and secured against axial movement relative to the shaft in known manner, and a double acting synchronizer clutch mechanism 18. The invention may provide self-energizing for both gears, as disclosed herein, or to only one of the gears, and for up and/or down shift. Also, the invention is readily used in a single acting synchronizer.

The shaft 12 includes cylindrical surfaces 12b, 12c rotatably supporting the gears thereon via unshown bearings and an annular hub 20 having an outer circumference greater in diameter than the diameters of the cylindrical surfaces. The hub has an axial length separating the gears via axially oppositely facing shoulders 20a, 20b which limit axial movement of the gears toward each other. Axial movement of the gears away from each other is limited in any of several known manners. The hub may be formed of a ring affixed to the shaft or, as herein, formed integral with the shaft. The outer circumference of the hub includes external splines 20c formed therein and three recesses 20d circumferentially spaced apart (only one shown) of axial length equal to the axial length of the hub and self-energizing cams 20e, 20f, in each recess and explained further hereinafter.

The synchronizer mechanism 18 includes friction rings 22, 24 and jaw clutches 26, 28 herein formed integral with gears 14, 16, an axially movable annular member 30 having internal spline teeth 30a slidably mating continuously with the external spline teeth 20c formed in the outer circumference of hub 20, jaw clutches 30b, 30c formed by the ends of splines 30a, a radially extending shift flange 32 having axially oppositely facing sides 32a, 32b sandwiched between axially facing sides of axially spaced apart retainers 34 extending radially outward from opposite axial ends of an outwardly facing annular surface of member 30, axially movable annular friction rings 36, 38 rigidly secured together by three circumferentially spaced apart pins 40 rigidly extending axially from each of the friction rings and through openings 32c in the flange, and three pre-energizer assemblies 42 with one partially shown in FIG. 1. The retainers, which are explained further hereinafter, prevent axial movement between annular member 30 and flange 32, and allow relative rotation therebetween. Flange sides 32a, 32b are formed by axially oppositely facing surfaces of annular stiffener rings extending axially from opposite sides of flange, 32 as in U.S. Pat. No. 5,738,195.

The friction rings include cone friction surfaces 22a, 36a and 24a, 38a that engage for frictionally synchronizing the gears to the shaft prior to engagement of the jaw clutches. The friction surfaces 36a, 38a and/or 22a, 24a may be defined by any of several known friction materials affixed to the base member; herein, pyrolytic carbon friction materials, such as disclosed in U.S. Pat. Nos. 4,700,823; 4,844,218; and 4,778,548, are preferred. These patents are incorporated herein by reference.

Pins 40 each include major diameter portions 40a having diameters slightly less than the diameter of flange openings 32c, a reduced diameter or groove portion 40b spaced between friction rings 36, 38 (herein midway), and conical blocker shoulders or surfaces 40c, 40d extending radially outwardly from the pin axis and axially away from each other at angles relative to a plane normal to the pin axis. The grooved portions, when disposed within their respective flange openings, allow limited rotation of the rigid friction ring and pin assembly relative to the flange to effect engagement of the pin blocker shoulders with chamfered blocker shoulders 32e defined about the flange openings 32c. The pins may be rigidly secured to friction rings 36, 38 in any of several known manners.

The pre-energizer assemblies 42 may be any of several types, herein they are of the split pin-type which are more completely shown and described in U.S. Pat. No. 5,339,936. Each pre-energizer assembly extends axially between the friction rings 36, 38 and through one of openings 32d in the shift flange. The openings 32d are alternately spaced between openings 32c. It should suffice herein to mention that each pre-energizer assembly includes two shells 44 (only one shown) having ends 44a and at least two leaf springs 46 sandwiched between and biasing the shells apart. Each pair of shells 44 forms a major diameter less than the diameter of its associated opening 32d when squeezed together, an annular groove 44b with chamfered end surfaces 44c, and the ends 44a. As is known, ends 44a react against friction rings 36, 38 and chamfers 44c react against chamfers about openings 32d in flange 32 in response to initial engaging movement of flange 32, thereby effecting initial engaging movement of the friction surfaces and initial torque for rotating pins 40 relative to flange 32 and positioning the blocker shoulders for engagement.

Figure 4:
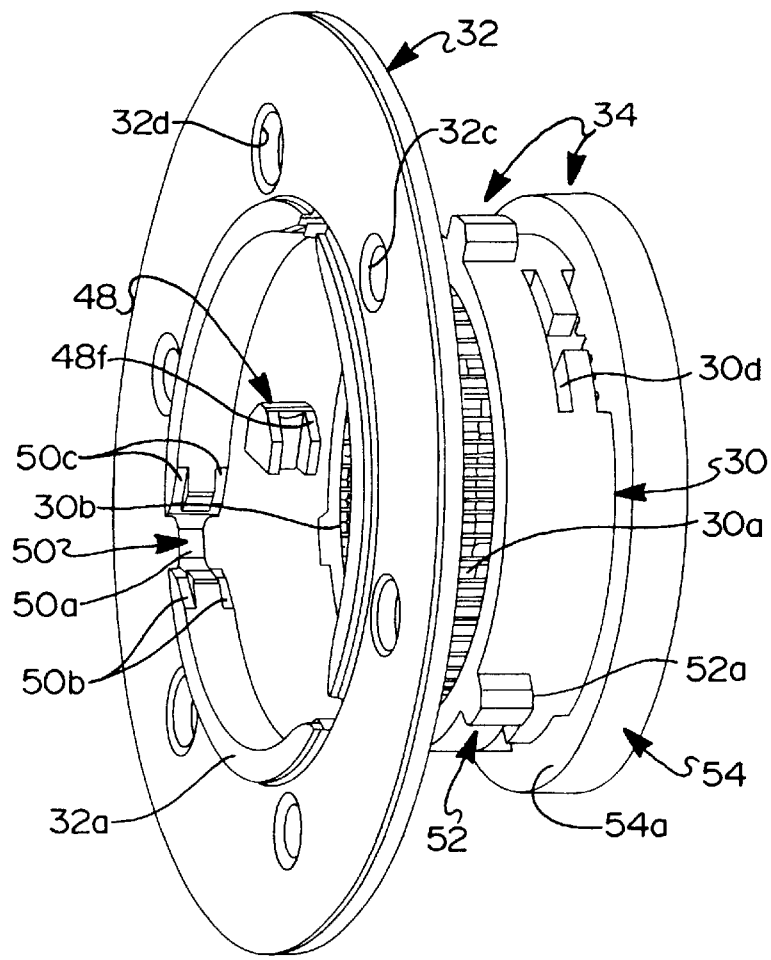
FIGS. 4, 5 and 6 are perspective views of some of the components in FIGS. 1 and 2 with the component in FIG. 5 enlarged.
Figure 5:
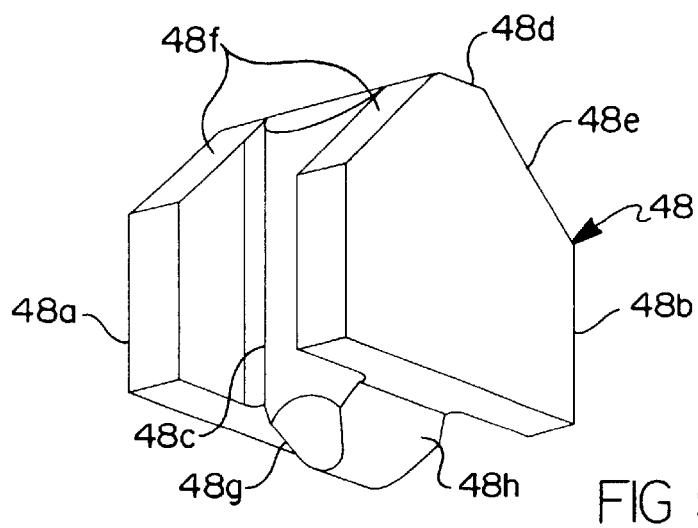
Figure 6:
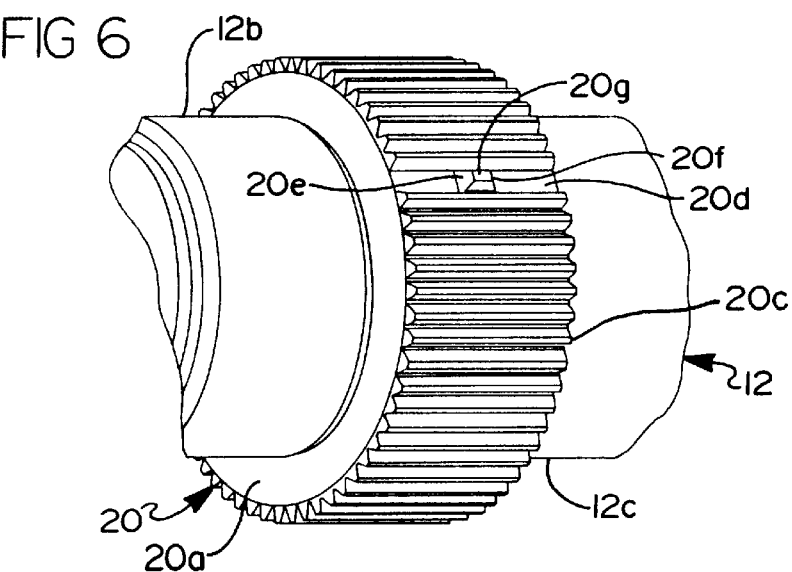
Figure 7:
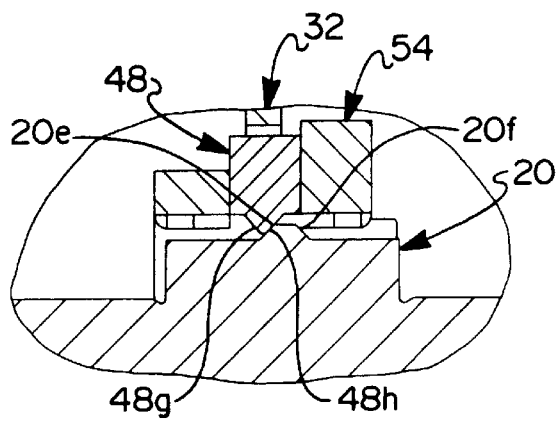
FIG. 7 is a partial view of FIG. 1 with components therein in a self-energizing or engaged position.
Figure 8:
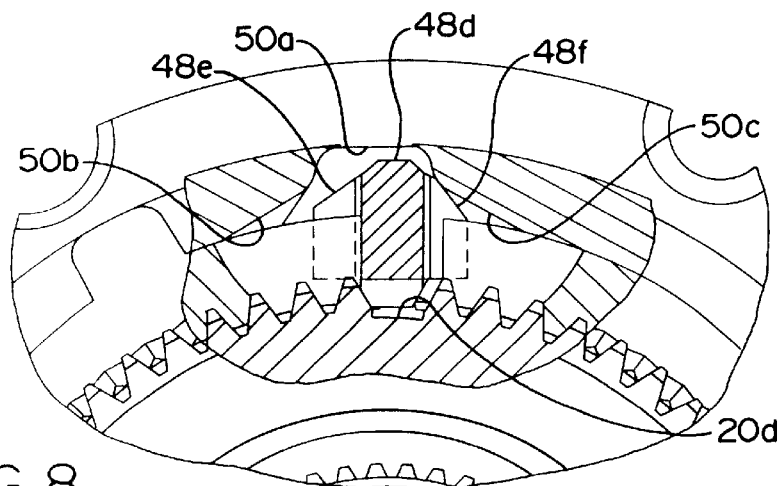
FIG. 8 is the view of FIG. 3 with components therein in the self-energizing position.

As previously mentioned, annular member 30 includes internal spline teeth 30a which slidably mate with external spline teeth 20c of hub 20 affixed to the shaft. The external splines have flank surfaces extending parallel to the shaft axis and the mating thereof with flank surfaces of the internal splines 30a prevents relative rotation therebetween. Annular member 30 further includes three radially extending openings 30d each having a self-energizing link 48 slidably extending there through. The links 48 are shown in section in FIGS. 1,2,3,7 and 8, and in perspective in FIGS. 4 and 5. Each link includes axially spaced apart flanges 48a, 48b joined together in H-shaped fashion by a web, 48c. The surfaces of the flanges and web are in close radial sliding rotation with H-shaped surfaces of each opening. The radially outer end of each link includes a flat apex surface 48d and two pairs of ramp surfaces 48e, 48f formed by the flanges and extending circumferentially in opposite direction from apex surfaces 48d. The radially inner end of each link includes ramp surfaces 48g, 48h.

Flange 32 further includes three self-energizing slots 50 or recesses in the inner surface of the flange. Each recess includes a non-self-energizing surface 50a aligned with the apex surface 48d when the synchronizer is in the neutral position of FIGS. 1–3 and self-energizing pairs of cam surfaces 50b, 50c extending circumferentially in opposite directions from surface 50a. Cam pairs 50b, 50c respectively react against ramp pairs 48e, 48f and move the link ramps 48h, 48g radially inward against either cam surface 20e, 20f respectively for reacting synchronizing torque between the cone clutches and shaft to provide an additive axial self-energizing force $F_a$ for increasing the engaging force of the cone clutches initially engaged by a shift force applied to flange 32, thereby increasing the synchronizing torque provided by the cone clutches. Ramp surfaces 48h, 48g on link 48 respectively react against cam surfaces 20e, 20f to provide the additive axial force for respectively increasing synchronizing torque of gears 14, 16 for up-shift and down-shift in response to the relative rotation of the flange respectively engaging the pairs of cam surfaces 50b, 50c with the pairs of ramp surface 48e, 48f of link 48. The cam and ramp surfaces, as shown herein, provide increasing synchronizing force for both gears and for increasing synchronizing force for up and down shifts.

As previously mentioned, retainers 34 include three circumferentially spaced apart abutment tabs 52 each having a surface 52a axially facing and spaced from a surface 54a of an annular abutment 54. Abutment 54 may be spaced apart tabs similar to tabs 52 but is preferably a full circle flange which increases the strength of annular member 30. During synchronizer assembly, the flange 32 is installed on annular member 30 by sliding flange slots 50 over tabs 52, then rotating the flange to radially align with annular member openings 30d. The links 48 are then inserted up through the opening before the annular member is mated with hub splines 20c.

Figure 2:
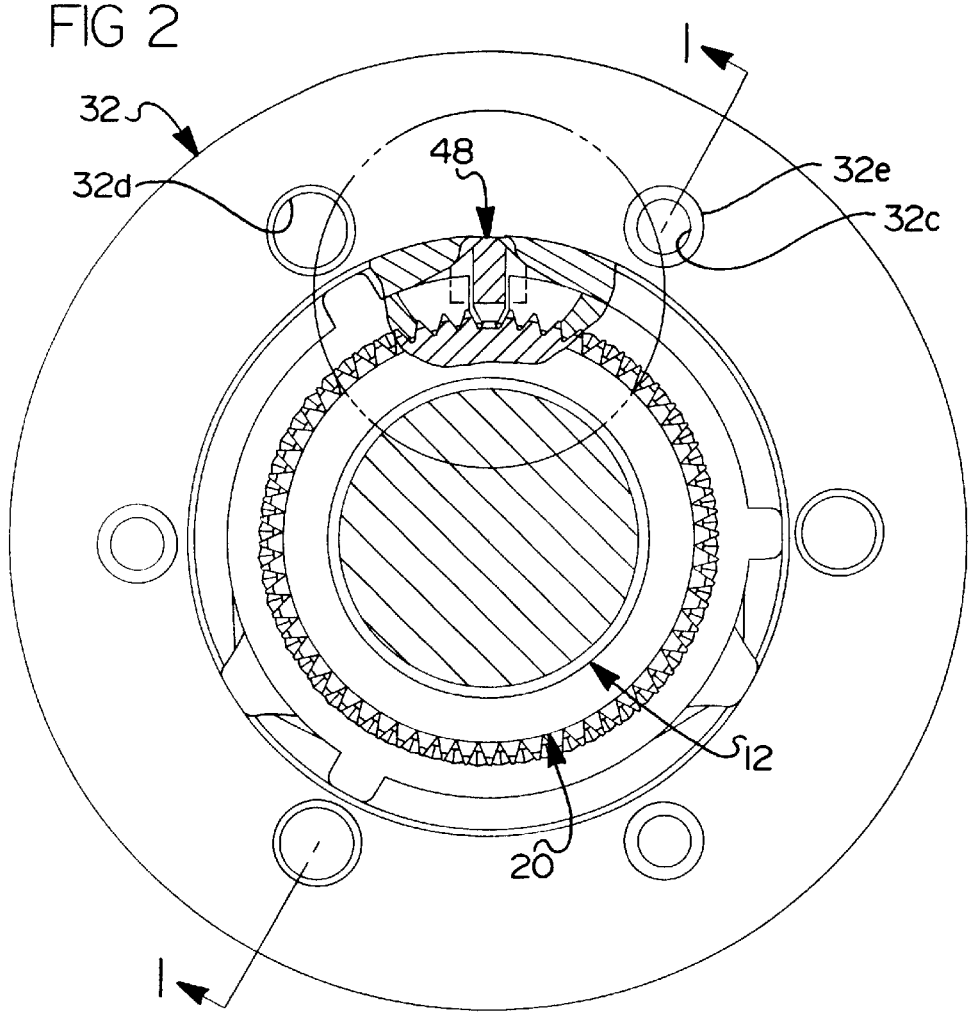
FIG. 2 illustrates the synchronizer of FIG. 1 partially sectioned and looking in the direction of arrow 2 in FIG. 1 with some of the components in FIG. 1 removed.
Figure 3:
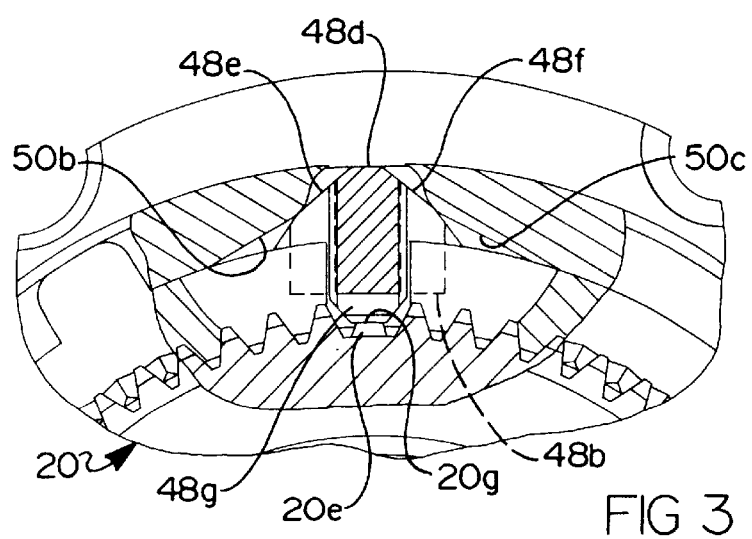
FIG. 3 is an enlarged view of the circled components in FIG. 2.

When the flange 32 is in the neutral position of FIGS. 1–3, reduced diameter portions 40b of pins 40 are aligned with flange openings 32c, friction surfaces of the cone clutches are slightly spaced apart and are maintained in a spaced apart relation by the chamfered or angled pre-energizer surfaces 44c of the pre-energizers 42 acting on the pre-energizer chamfered surfaces about flange openings 32d by the force of springs 46, and links 48 are aligned for contact with axially extending flats 20g between cams 20e, 20f. The flats 20g and axial force provided by the pre-energizer surfaces prevent inadvertent self-energizing and engagement of the synchronizer due to viscous shear of oil between the cone clutch surfaces. When it is desired to couple either gear to the shaft, an appropriate and unshown shift mechanism, such as disclosed in U.S. Pat. No. 4,920,815 and incorporated herein by reference, is connected to the outer periphery of flange 32 in known manner for moving the flange axially along the axis of shaft 12 either left to couple gear 14 or right to couple gear 16. The shift mechanism may be manually moved by an operator through a linkage system, may be selectively moved by an actuator, or may be moved by means which automatically initiate shift mechanism movement and which also controls the magnitude of the force applied by the shift mechanism. When the shift mechanism is manually moved, the force is proportional to the force applied by the operator to a shift lever. Whether manually or automatically applied, the force is applied to flange 32 in an axial direction.

Initial leftward axial movement of flange 32 by the operator shift force Fo is transmitted to pre-energizer surfaces 44c to effect initial frictional engagement of cone surface 36a with cone surface 22a. The initial engagement force on the cone surfaces is of course a function of the force of springs 46 and the angles of the pre-energizer surfaces. The initial frictional engagement (provided an asynchronous condition exists and momentarily ignoring the effect of the self-energizing cams) produces an initial cone clutch engaging force and initial synchronizing torque which ensures limited relative rotation between flange 32 and the engaged friction ring, and hence, movement of the reduced diameter pin portions 40b to the appropriate sides of the flange openings 32c to provide engagement of pin blocker shoulders 40c with the blocker shoulders 32e disposed about openings 32c. When the blocker shoulders are engaged, the full operator shift force $F_o$ on flange 32 is transmitted to friction ring 36 via the blocker shoulders, whereby the cone clutch is engaged by the full force of the operator shift force $F_o$ to provide a resultant operator synchronizing torque $T_o$. Since the blocker shoulders are disposed at angles relative to the axial direction of operator shift force $F_o$, they produce a counter force or unblocking torque which is counter to the synchronizing torque from the cone clutch but of lesser magnitude during asynchronous conditions. As substantial synchronism is reached, the synchronizing torque drops below the unblocking torque, whereby the blocker shoulders move the pins 40 into concentric relation with openings 32c to allow continued axial movement of the flange and engagement of the internal spline/jaw teeth 30b of annular member 30 with external spline/jaw teeth of jaw clutch 26 of gear 14. The jaw teeth may be configured as shown in U.S. Pat. Nos. 3,265,173 and 4,246,993 which are incorporated herein by reference.

Looking now at the affects of the self-energizing cams, the synchronizing torque $T_o$, due to the operator applied axial shift force $F_o$, is of course transmitted to flange 32 by pins 40 and is reacted to shaft 12 across the self-energizing cam and ramp surfaces. The self-energizing cam and ramp surfaces, when engaged, produce an axial additive force $F_a$ acting on the flange in the same direction as shift force $F_o$. The axial additive force $F_a$ is applied to the engaged friction surfaces through the blocker surfaces via a force path including link 48 reacting axially against annular member openings 30d, the retainers 34 and the flange 32. The forces $F_o$ and $F_a$ are applied to shift flange 32 in parallel and sum to provide a total force $F_t$, thereby further increasing the engaging force of the cone clutch to provide an additive synchronizing torque $T_a$ which adds to the torque $T_o$ to provide a total torque $T_t$. The sum of the axial forces for engaging the cone clutch are $F_o$ plus $F_a$ and the sum of the synchronizing torques being produced by the cone clutch are $T_o$ plus $T_a$. For a given operator shift force $F_o$ and an operator synchronizing torque $T_o$, the magnitude of the axial additive force is preferably a function of the angles of the engaged self-energizing ramp surfaces. These angles are preferably great enough to produce an additive force $F_a$ of magnitude sufficient to significantly increase synchronizing torque and decrease synchronizing time in response to a given moderate shift effort by the operator. However, these angles are also preferably low enough to produce a controlled axial additive force $F_a$, i.e., the force $F_a$ should preferably increase or decrease in response to the force $F_o$ increasing or decreasing. The main variables and equations for calculating self-energizing ramp angles may be seen by reference to previously mentioned U.S. Pat. No. 5,092,439.

A pin-type synchronizer has been disclosed to illustrate inventive subject matter herein. The following claims are intended to cover inventive portions of the disclosed subject matter and variations and modifications believed to be within the spirit of the invention.

What is claimed is:

1. A self-energizing synchronizer for frictional and positive connection of first and second drives disposed for relative rotation about a common axis; the synchronizer comprising:

an annular member including a first jaw clutch non-rotatable relative to the first drive and axially movable relative to the drives from a neutral position to an engaged position with a second jaw clutch for positive connecting the drives in response to engaging movement of the first jaw clutch by an axially directed shift force ($F_o$) moving a radially extending flange toward the second jaw clutch, the flange having axially oppositely facing sides and a radially inner portion receiving an annular outwardly facing surface of the annular member;

retainer means connecting the flange for axial movement with the first jaw clutch;

a first friction member axially movable into engagement with a second friction member in response to an initial portion of the engaging movement of the first jaw clutch for producing an initial synchronizing torque;

first and second blocker surfaces movable into engagement in response to the initial synchronizing torque for preventing asynchronous engagement of the jaw clutches and for transmitting the shift force ($F_o$) to effect an engagement force of the friction members and for producing a torque counter to the synchronizing torque for moving the blocker surfaces out of engagement as synchronization is reached, the first blocker surfaces defined by a plurality of circumferentially spaced apart pins rigidly extending axially from the first friction member and into openings in the flange, the second blocker surfaces defined about the openings, and the pins operative to transmit the synchronizing torque to the flange;

self-energizing means including a plurality of circumferentially spaced first cam means affixed to the flange, an equal plurality of circumferentially spaced apart second cam means affixed to the first drive, an equal plurality of circumferentially spaced apart and radially extending openings in the annular member, a radially movable link deposed in each opening and having radially outer and inner ends respectively disposed for engagement with the first and second cam means and operative when engaged to react the synchronizing torque therebetween for producing an additive axial force in the direction of the shift force for increasing the engagement force of the friction members; characterized by:

the retainer means including axially spaced apart first and second abutments extending radially outward from opposite axial ends of the annular member outwardly facing surface for axially embracing the flange sides, the first abutment being a plurality of circumferentially spaced about tabs circumferentially offset from the openings and receiving slots in the radially inner portion of the flange for allowing positioning of the flange sides between the abutments during assembly of the synchronizer.

2. The synchronizer of claim 1, wherein:

a circumferentially extending portion of each slot defines the first cam means and the slots are aligned with the openings when the synchronizer is assembled.

3. The synchronizer of claim 1, wherein:

each first cam means includes a first pair of cam surfaces facing radially inward and axially spaced apart; and each link having axially spaced apart first and second flange portions joined together in H-shaped fashion by a web portion with surfaces of the flange and web portions in close sliding relation with mating surfaces of the opening, radially outer ends of the first and second flange portions defining a first pair of ramp surfaces engagable with the first pair of cam surfaces, and a radially inner end of the web portion defining a second ramp surface engagable with the second cam means.

4. The synchronizer of claim 3, wherein:

a circumferentially extending portion of each slot defines the first pair of cam surfaces and the slots are aligned with the openings when the synchronizer is assembled.

5. The synchronizer of claim 4, further including a third drive axially spaced from the second drive and secured against axial movement and for relative rotation about the common axis;

the annular member includes a third jaw clutch non-rotatable relative to the first drive and axially movable relative to each drive from the neutral position to an engaged position with a fourth jaw clutch for positive connecting the first and third drives in response to engaging movement of the third jaw clutch by a second axially directed shift force ($F_o$) moving the flange toward the fourth jaw clutch;

a third friction member axially movable into engagement with a fourth friction member in response to an initial portion of the engaging movement of the third jaw clutch for producing a second initial synchronizing torque for the third and fourth jaw clutches;

third and fourth blocker surfaces movable into engagement in response to the second initial synchronizing torque for preventing asynchronous engagement of the third and fourth jaw clutches and for transmitting the second shift force ($F_o$) to effect an engagement force of the third and fourth friction members and for producing a torque counter to the second synchronizing torque for moving the third and fourth blocker surfaces out of engagement as synchronization is reached, the third blocker surfaces defined by the pins rigidly extending axially from the third friction member and into the openings in the flange, the fourth blocker surfaces defined about the openings, and the pins operative to transmit the second synchronizing torque to the flange; and the self-energizing means including a plurality of circumferentially spaced third cam means affixed to the flange, an equal plurality of circumferentially spaced apart fourth cam means affixed to the first drive, the radially movable link deposed in each opening having the radially outer and inner ends respectively engagable with the third and fourth cam means and operative when engaged to react the second synchronizing torque therebetween for producing a second additive axial force in the direction of the second shift force for increasing the engagement force of the friction members.

6. The synchronizer of claim 5, wherein:

a portion of each slot extending circumferentially opposite the first cam means defines the third cam means.

7. The synchronizer of claim 5, wherein:

each third cam means includes a third pair of cam surfaces facing radially inward and axially spaced apart; and each link radially outer ends of the first and second flange portions defining a third pair of ramp surfaces extending circumferentially opposite the first pair of ramp surfaces and engagable with the third pair of cam surfaces, and the radially inner end of the web portion defines a fourth ramp surface engagable with the fourth cam means.

8. The synchronizer of claim 7, wherein:

a portion of each slot extending circumferentially opposite the first pair of cam surfaces defines the third cam means.

9. A self-energizing synchronizer for frictional and positive connection of first and second drives disposed for relative rotation about a common axis; the synchronizer comprising:

an annular member including first jaw clutch non-rotatable relative to the first drive and axially movable relative to the drives from a neutral position to an engaged position with a second jaw clutch for positive connecting the drives in response to engaging movement of the first jaw clutch by an axially directed shift force ($F_o$) moving a radially extending flange toward the second jaw clutch, the flange having axially oppositely facing sides and a radially inner portion receiving an annular outwardly facing surface of the annular member;

retainer means connecting the flange for axial movement with the first jaw clutch;

a first friction member axially movable into engagement with a second friction member in response to an initial portion of the engaging movement of the first jaw clutch for producing an initial synchronizing torque;

first and second blocker surfaces movable into engagement in response to the initial synchronizing torque for preventing asynchronous engagement of the jaw clutches and for transmitting the shift force ($F_o$) to effect an engagement force of the friction members and for producing a torque counter to the synchronizing torque for moving the blocker surfaces out of engagement as synchronization is reached, the first blocker surfaces defined by a plurality of circumferentially spaced apart pins rigidly extending axially from the first friction member and into openings in the flange, the second blocker surfaces defined about the openings, and the pins operative to transmit the synchronizing torque to the flange;

self-energizing means including a plurality of circumferentially spaced first cam means affixed to the flange, an equal plurality of circumferentially spaced apart second cam means affixed to the first drive, an equal plurality of circumferentially spaced apart and radially extending openings in the annular member, a radially movable link deposed in each opening and having radially outer and inner ends respectively disposed for engagement with the first and second cam means and operative when engaged to react the synchronizing torque therebetween for producing an additive axial force in the direction of the shift force for increasing the engagement force of the friction members; characterized by:

each first cam means including a first pair of cam surfaces facing radially inward and axially spaced apart; and each link having axially spaced apart first and second flange portions joined together in H-shaped fashion by a web portion with surfaces of the flanges and web in close sliding relation with mating surfaces of the opening, radially outer portions of the first and second flanges defining a first pair of ramp surfaces engagable with the first pair of cam surfaces, and a radially inner portion of the web defining a second ramp surface engagable with the second cam means.

10. The synchronizer of claim 9, wherein:

the flange includes a plurality of slots each having a circumferentially extending portion defining the first pair of cam surfaces and the slots are aligned with the openings when the synchronizer is in the neutral position.

11. The synchronizer of claim 10, wherein:

the retainer means including axially spaced apart first and second abutments extending radially outward from opposite axial ends of the annular member outwardly facing surface for axially embracing the flange sides, the first abutment being a plurality of circumferentially spaced about tabs circumferentially offset from the openings and receiving slots in the radially inner portion of the flange for allowing positioning of the flange sides between the abutments during assembly of the synchronizer.

12. The synchronizer of claim 10, further including a third drive axially spaced from the second drive and secured against axial movement and for relative rotation about the common axis;

the annular member includes a third jaw clutch non-rotatable relative to the first drive and axially movable relative to each drive from the neutral position to an engaged position with a fourth jaw clutch for positive connecting the first and third drives in response to engaging movement of the third jaw clutch by a second axially directed shift force ($F_o$) moving the flange toward the fourth jaw clutch;

a third friction member axially movable into engagement with a fourth friction member in response to an initial portion of the engaging movement of the third jaw clutch for producing a second initial synchronizing torque for the third and fourth jaw clutches;

third and fourth blocker surfaces movable into engagement in response to the second initial synchronizing torque for preventing asynchronous engagement of the third and fourth jaw clutches and for transmitting the second shift force ($F_o$) to effect an engagement force of the third and fourth friction members and for producing a torque counter to the second synchronizing torque for moving the third and fourth blocker surfaces out of engagement as synchronization is reached, the third blocker surfaces defined by the pins rigidly extending axially from the third friction member and into the openings in the flange, the fourth blocker surfaces defined about the openings, and the pins operative to transmit the second synchronizing torque to the flange; and the self-energizing means including a plurality of circumferentially spaced third cam means affixed to the flange, an equal plurality of circumferentially spaced apart fourth cam means affixed to the first drive, the radially movable link deposed in each opening having the radially outer and inner ends respectively engagable with the third and fourth cam means and operative when engaged to react the second synchronizing torque therebetween for producing a second additive axial force in the direction of the second shift force for increasing the engagement force of the friction members.

13. The synchronizer of claim 12, wherein:

a portion of each slot extending circumferentially opposite the first cam means defines the third cam means.

14. The synchronizer of claim 10, wherein:

the retainer means including axially spaced apart first and second abutments extending radially outward from opposite axial ends of the annular member outwardly facing surface for axially embracing the flange sides, the first abutment being a plurality of circumferentially spaced about tabs circumferentially offset from the openings and receiving slots in the radially inner portion of the flange for allowing positioning of the flange sides between the abutments during assembly of the synchronizer.

* * * * *